Jan. 22, 1929.        E. V. PLATIN        1,699,916
DOUGH KNEADING MACHINE
Filed March 10, 1927
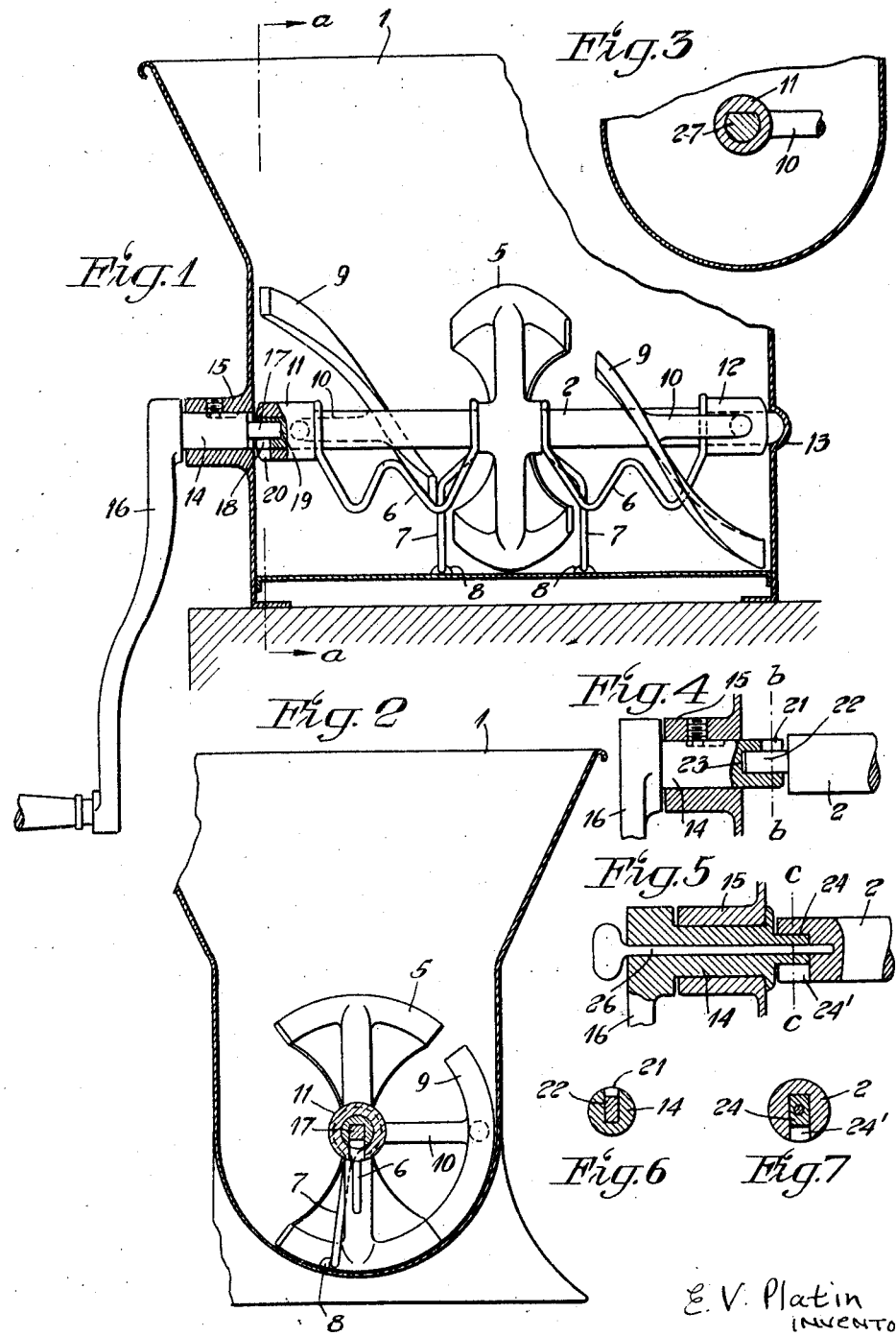
E. V. Platin
INVENTOR
By: Marks & Clerk
Attys.

Patented Jan. 22, 1929.

1,699,916

UNITED STATES PATENT OFFICE.

ERNST VILHELM PLATIN, OF JONKOPING, SWEDEN, ASSIGNOR TO HUSQVARNA VAPEN-FABRIKS AKTIEBOLAG, OF HUSQVARNA, SWEDEN, A CORPORATION.

DOUGH-KNEADING MACHINE.

Application filed March 10, 1927, Serial No. 174,367, and in Sweden March 10, 1926.

The present invention refers to dough kneading machines and has for its object to arrange the kneading members not only so that they will be capable of effecting the kneading work as completely and uniformly as possible and in the shortest possible time, but also in such a manner that they may be easily separated from the mass of dough upon completion of the kneading operation. The last mentioned possibility is what is aimed at, above all, in order to remove the difficulty which otherwise is involved in freeing the kneading members from the dough when the machine is emptied. The arrangement according to the invention makes it possible, upon completion of the kneading operation, to turn out the whole mass of dough from the kneading trough; when this is done, the mass of dough is accompanied by all kneading members which can then be easily removed, each per se, from the mass of dough and be separated from the latter.

The invention is principally distinguished by the fact that the kneading members are each per se loosely mounted on their shaft, so that they may be detached from the same when it is removed from the trough of the machine, for which latter purpose the shaft is loosely mounted in such a manner as to fall out of the trough, together with the mass of dough, when the trough is turned over.

The accompanying drawing illustrates an embodiment of the invention. Fig. 1 shows the machine in longitudinal section, and Fig. 2 the same in cross section on line $a$—$a$ in Fig. 1. Fig. 3 shows a detail. Figs. 4 and 5 show modified arrangements of the connection between the shaft of the machine and the crank by means of which the shaft is turned around. Figs. 6 and 7 show cross sections on line $b$—$b$ in Fig. 4 and line $c$—$c$ in Fig. 5 respectively.

Journalled in the kneading trough 1 is a shaft 2 with kneading members mounted thereon. The kneading members comprise, first, the propeller-shaped wing 5, which is moved up on the shaft to the middle portion thereof, and, second, the straps 6 which are moved up on the shaft, one on either side of the wing 5, said straps remaining stationary during the kneading operation, that is to say, being prevented from following in the movement of the shaft, in that they are provided with projections 7 bearing against fixed abutments 8 at the bottom of the trough 1, and, third, the screw-shaped wings 9 which are carried by arms 10 extending from hubs 11 and 12 mounted on the ends of the shaft. These shaft ends are milled off on the one side and fit into segment-shaped hollows 27 (Fig. 3) in the hubs 11 and 12, whereby the latter are carried along in the rotary movement of the shaft.

Shaft 2 is journalled in the trough 1 and enters with its one end into a spherical bulge 13 in the one head piece of the trough. The opposite end of the shaft is detachably connected with the journal 14 which is adapted to turn in a bearing 15 secured to the outside of the other head piece of the trough and which is rigidly connected with the crank 16. According to Figs. 1 and 2, the journal 14 is displaceable in the bearing 15, but not further out, however, than that the inner portion 17 of the journal, which is preferably of rectangular cross section, always projects into the trough. The portion 17 fits into a laterally open slot 18 in the shaft 2 and the latter is provided with a central hollow 19 forming an extension of said slot and adapted to receive the portion 17 when the journal 14 is in its innermost position. In the last-mentioned position of the journal 14, the latter and the shaft 2 are locked to one another, and all of the kneading members mounted on the shaft are locked to the latter. The hub 11 mounted on the shaft 2 has a laterally open slot 20 corresponding to and registering with the slot 18 of the shaft when the hub 11 is mounted on the shaft.

When the journal 14 is pulled out into the position shown in Fig. 1, the shaft 2 may be moved out by the end portion 17 of the journal which then moves freely out of the slot 18 in the shaft and also out of the slot 20 in the hub 11. This will occur if the trough 1 is turned upside down with the kneaded mass of dough therein. The mass will then fall out of the trough, and is accompanied by the shaft embedded in the mass and by the kneading members mounted on the shaft, whereupon the parts thus entrained can be readily taken out of the mass and be separated and readily cleaned, each per se. When the shaft 2 is to be inserted anew, after the kneading members have again been mounted thereon, the shaft is first introduced with the one end into the bulge 13 and is then kept turned in such a manner that the portion 17 of the journal can enter through the slots 20 and 18 when the shaft is laid down. When the portion 17 strikes against the bottom of the slot, the shaft is again in its proper position. The journal 14 is then moved in, the shaft and the journal being then again locked to one another.

According to Figs. 4 and 6, the journal 14 is also displaceable and provided with a slot 21 adapted to receive the portion 22 of the shaft, which portion is of rectangular cross section. The said portion of the shaft also enters a central hollow 23 in the journal 14, when the latter is in its innermost position.

According to Figs. 5 and 7, the journal 14 is not displaceable and enters with the portion 24 into the slot 24' of the shaft. Displaceable through the journal, longitudinally thereof, is a bolt 26 accessible from the outside, said bolt when occupying its innermost position entering a central hollow in the shaft 2 so as to keep the shaft and the journal locked to one another.

Obviously, the crank journal 14 may be made without a locking device. In the latter case, there must instead be provided, at the opposite end of the shaft, a locking device made as hereinbefore described, there being then provided, in place of the spherical bulge 13, a stud displaceable through the wall of the trough and corresponding to the journal 14 and entering a slot in the shaft, or provided with a slot adapted to receive the shaft.

When the crank 16 is turned in a clockwise direction, according to the drawing, the mass of dough will be kneaded very thoroughly, inasmuch as the two screw-shaped wings 9 will, each per se, drive the mass outwardly from the head pieces of the trough and inwardly toward the central wing 5 which latter, on the other hand, drives the mass of dough outwardly against the head pieces of the trough. The stationary straps 6 prevent the mass from being entrained in the rotary movement of the movable kneading members.

What I claim is:—

1. A dough kneading machine including a trough, a shaft, kneading members detachably mounted on the shaft whereby they may be detached therefrom when the latter is taken out of the trough, the shaft being loosely mounted and adapted to be released, whereby it may fall out of the trough together with the mass of dough, when the trough or container is turned over, straps adapted to be mounted on the shaft on both sides of the wing situated at the central portion thereof, fixed abutments in the trough coacting with the straps to maintain the latter so that the straps will remain stationary during the kneading operation so as to prevent the mass of dough from taking part in the rotary movement of the movable kneading members.

2. A dough kneading machine as claimed in claim 1, characterized by a non-displaceable journal provided with a bolt displaceable therein, said bolt entering a central hollow in the shaft, when the journal is introduced into the slot of the shaft, the latter being thus prevented from being separated from the stud.

In testimony whereof I affix my signature.

ERNST VILHELM PLATIN.